Nov. 26, 1968   H. KOCHER ET AL   3,412,960
METHOD AND APPARATUS FOR REGULATING THE ORIENTATION OF
ACCELERATION-CONTROLLED BODIES
Filed May 24, 1966   3 Sheets-Sheet 3
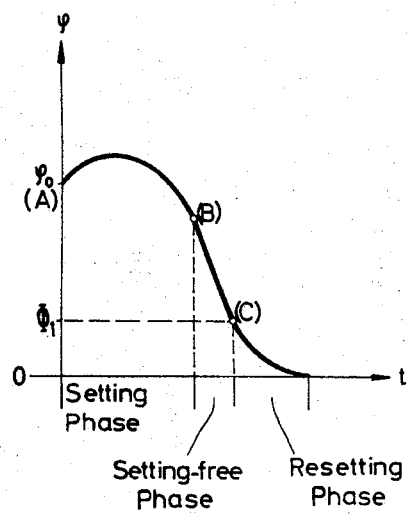
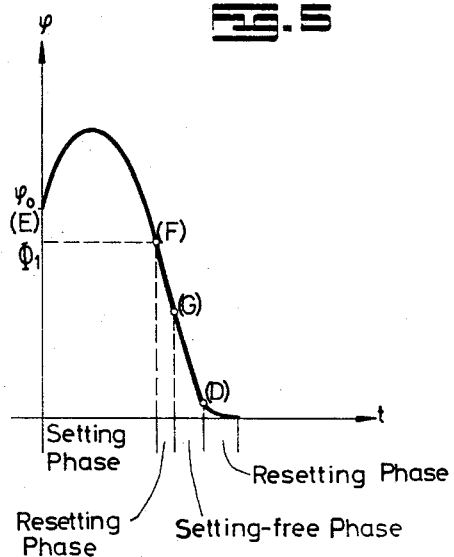
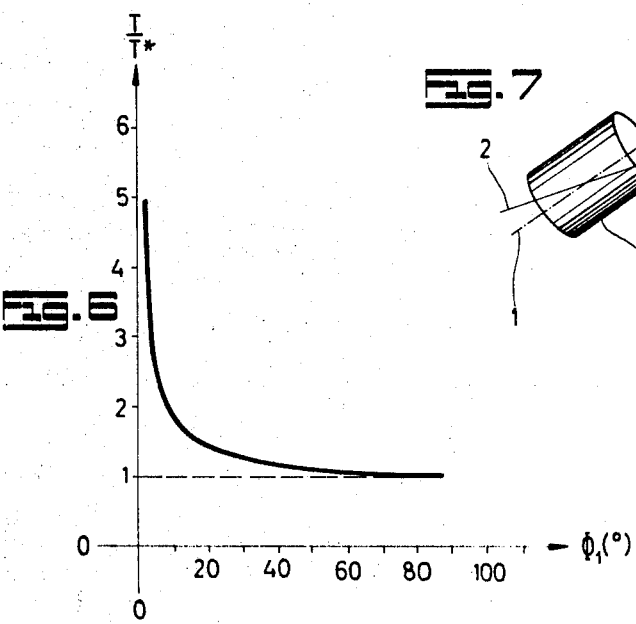
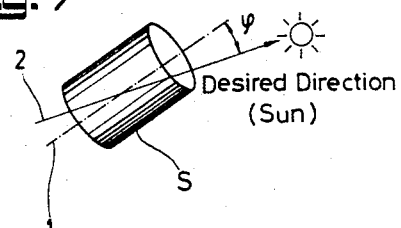
INVENTORS
**Heinz Kocher
Werner Kitzig
Piet Witteveen**

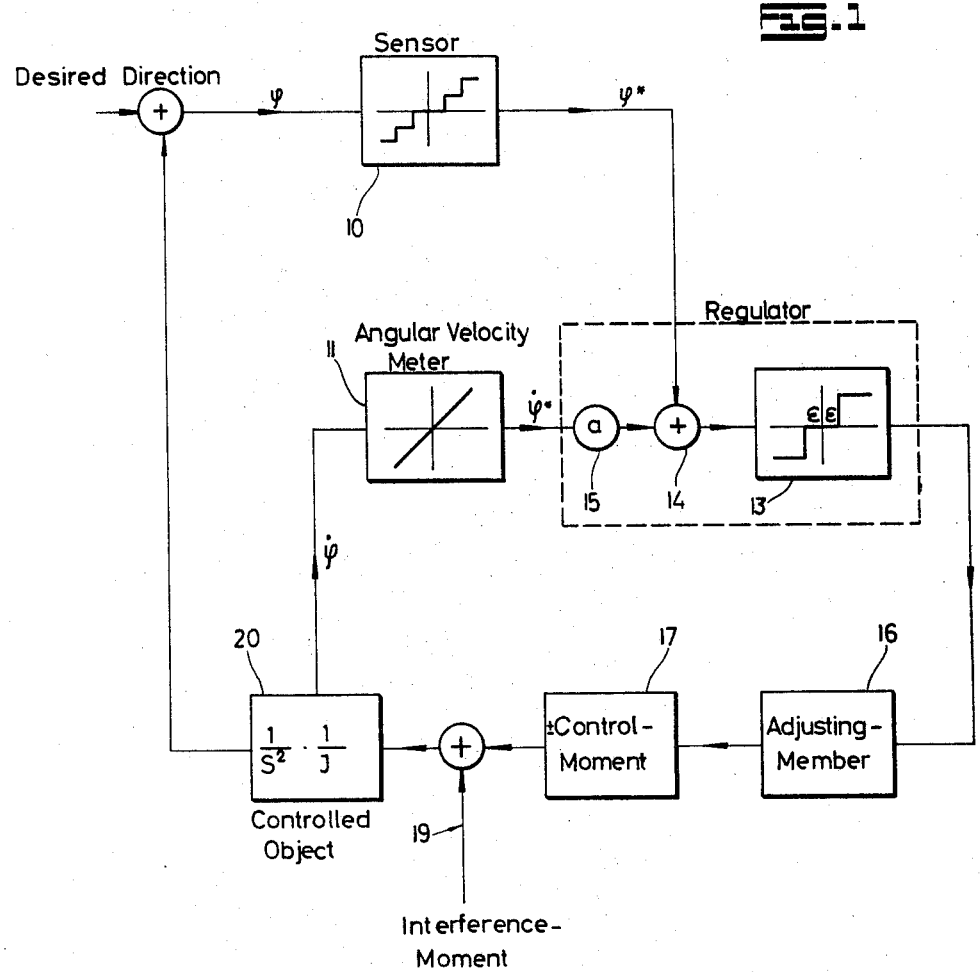

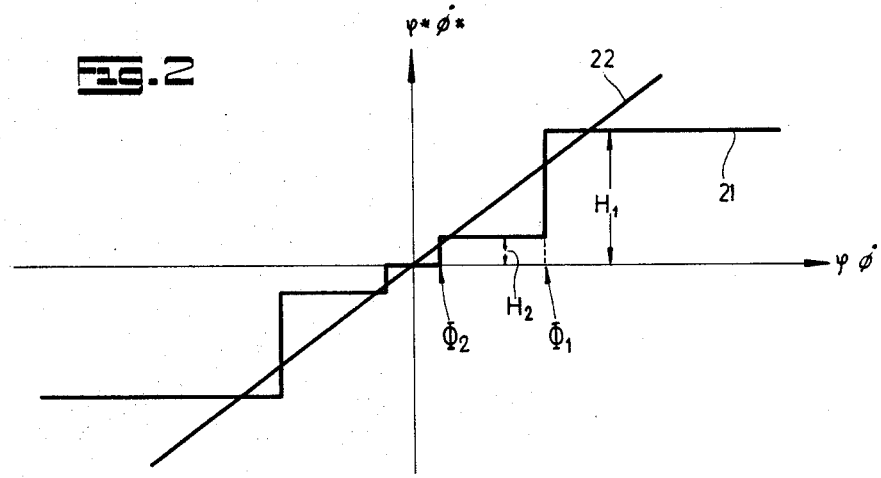
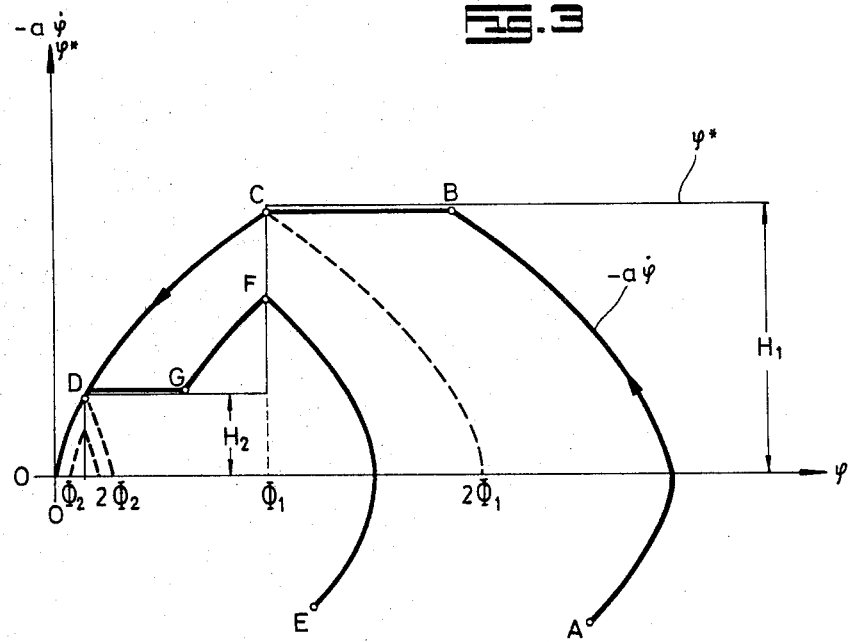

United States Patent Office 3,412,960
Patented Nov. 26, 1968

3,412,960
METHOD AND APPARATUS FOR REGULATING THE ORIENTATION OF ACCELERATION-CONTROLLED BODIES
Heinz Kocher, Ottobrunn, and Werner Kitzig and Piet Witteveen, Munich, Germany, assignors to Bolkow Gesellschaft mit beschrankter Haftung, Ottobrunn, near Munich, Germany
Filed May 24, 1966, Ser. No. 552,580
Claims priority, application Germany, May 28, 1965, B 82,137
10 Claims. (Cl. 244—77)

ABSTRACT OF THE DISCLOSURE

The disclosure is a method and apparatus for regulating the orientation of an acceleration-controlled body. A first sensor provides a step output signal corresponding to the magnitude and direction of a deviation of the body from a predetermined orientation, and a second sensor, such as an angular velocity meter, provides a linearly variable output signal corresponding to the angular velocity of the deviation. The step signal and the linearly variable signal are compared in a three-position regulator having a dead zone extending to each side of its null position, and the regulator provides a deviation correcting signal for adjusting the orientation of the controlled body through a setting phase to a setting-free phase or a resetting phase, and vice versa. Switching from one phase to another is effected only when the difference between the step signal and the linearly variable signal is equal to the half-width of the dead zone.

This invention relates to the regulation of the orientation of an acceleration-controlled body and, more particularly, to a novel method of and apparatus for regulating the orientation of such acceleration-controlled bodies wherein the respective deviation from the theoretical orientation is determined according to the amplitude, direction and rate of acceleration and by means of measuring feelers or sensors, with the sensed deviations being converted by a regulator into an orientation setting or correcting signal or order for the acceleration-controlled body.

An object of the present invention is to provide a method of and apparatus for regulating the orientation of acceleration-controlled bodies and with which a determined deviation can be eliminated or corrected within an optimum time.

Another object of the invention is to provide such a regulating method and apparatus utilizing a so-called three-point regulator which, as known to those skilled in the art, can assume the positions minus, null or zero, and plus.

A further object of the invention is to provide such a regulating method and apparatus, involving a three-point regulator, in which the regulation is improved by combining the acceleration rate with the direction and magnitude of the controlled deviation.

Yet another object of the invention is to provide such a regulating method and apparatus in which the switching time from a setting phase to a setting-free phase or to a resettting phase, and vice versa, is determined by comparing a variable function, such as a step function, corresponding to direction and magnitude of the deviation, and a steady function, corresponding to the rate of the deviation.

A further object of the invention is to provide a regulating method and apparatus as just described in which switching from one phase to the other takes place when the difference between the step function and the steady function is equal to half the width of the dead zone of a three-point regulator.

Still another object of the invention is to provide a regulating method and apparatus as just described in which the steady function of the rate of the deviation is supplied by a measuring feeler or sensor and is multiplied by a constant factor.

A further object of the invention is to provide a regulating method and apparatus as just mentioned in which said constant factor is determined by the characteristic of the step function and by the acceleration capacity of the system to be regulated.

Yet another object of the invention is to provide a regulating method and apparatus of the type mentioned above, wherein the control circuit is less sensitive to accidental interferences such as "noise."

A further object of the invention is to provide a regulating apparatus of the type mentioned using simple, rugged and reliable measuring feelers or sensors providing quantitative readings, such as feelers having a stepped characteristic.

In accordance with the invention, the method involves comparing, to determine the switching time from a setting phase to a setting-free phase or to a resetting phase, and vice versa, the information supplied by a measuring feeler, as a step function of the deviation, with respect to amplitude and direction, with a steady function of the rate of this deviation, as supplied by another measuring feeler or sensor and multiplied by a constant factor. In accordance with the method, the switching from one phase to the other takes place when the difference between step function and the steady function is equal to the half width of the dead zone of a three-point regulator, with the constant factor being determined by the characteristic of the step function and the acceleration capacity of the system to be regulated.

By the invention method and apparatus, a practically optimum time regulation is possible, as will be explained in detail hereinafter. This requires only a reversal of the polarity of the orientation correcting moment to eliminate a deviation, since hunting or overswing, which occurs, for example, in an optimum two-point regulating apparatus, is avoided. The invention method and apparatus, using a sensor or feeler providing a quantitative reading, such as a sensor or feeler having a stepped characteristic, is particularly advantageous for many uses and especially for adjustment of the orientation of satellites. Accordingly, the invention will be described hereinafter as applied to adjustment of the orientation of a satellite, but it should be understood that the invention is not limited to this particular application.

For an understanding of the principles of the invention, reference is made to the following description of a typical embodiment thereof as illustrated in the accompanying drawings.

In the drawings:

FIG. 1 is a block circuit diagram of a control circuit for performing the method of the invention;

FIG. 2 illustrates the characteristic of a measuring feeler or sensor useable with the method of the invention for determining the amplitude and direction of the deviation;

FIG. 3 is a graphic representation of a regulating operation in the phase plane;

FIGS. 4 and 5 are graphic representations of the course of the regulation as a function of time;

FIG. 6 is a graphic representation of the ratio of normal optimum regulation time as a function of the amplitude of the deviation to be eliminated or corrected; and FIG. 7 is a diagrammatic view showing the angular deviation of a satellite, selected as an example of the application of the invention method and apparatus.

In adjusting the position or orientation of a satellite S (FIG. 7), it is necessary to align an axis 1 of satellite S accurately with the sun or a star, the direction to the sun or the star being indicated by the axis 2 of FIG. 7. The angular deviation $\phi$ between the theoretical direction 2 and the actually assumed direction of the satellite axis 1 represents the deviation to be eliminated or corrected by operation of the invention regulator. The magnitude and direction of the angular deviation are determined by means of a measuring feeler having a stepped, and thus variable, characteristic 21 as shown in FIG. 2. The measuring feeler, hereinafter called a sensor, provides an output $\phi^*$ representative of the magnitude and direction of the deviation angle $\phi$ between axes 1 and 2 of FIG. 7.

The rate of the deviation is an angular velocity $$\dot{\phi}$$

and is indicated, for example, by an angular velocity meter having a linear, and thus steady, characteristic and providing an output $$\dot{\phi}^*$$

representative of the rate of the deviation between the axes 1 and 2.

The block circuit diagram of FIG. 1 represents apparatus suitable for carrying out the regulating method of the invention, and including a senor 10 and an angular velocity meter 11. The form of the characteristic of the sensor, that is, the number, position and height of the steps of the characteristic, depends only on the desired regulation range, just as, inversely, the size of the control parameter is determined by the selected sensor characteristic.

As indicated within the broken line block of FIG. 1, the three-point regulator comprises a comparator circuit 13, having a dead zone $2\epsilon$, to which is connected, in series, an addition stage 14 and a multiplication stage 15. By this arrangement, the proportionality value $$\dot{\phi}^*$$

of the angular velocity is multiplied by a constant factor $a$ and added to the value $\phi^*$ of the direction and magnitude $\phi$ of the deviation as sensed by sensor 10. Thus the summation value $$\phi^* + a\dot{\phi}^*$$

is supplied to comparator circuit 13. When the sum of the measured magnitude and direction of the deviation $\phi^*$ and the rate of the deviation $$a\dot{\phi}^*$$

is outside the range of the dead zone $2\epsilon$ of comparator circuit 13, the latter actuates an adjusting member 16. Depending on the sign of the sum $$\phi^* + a\dot{\phi}^*$$

member 16 provides either a positive control signal or a negative control signal for an engine 17. The positive and negative control motions are equal in magnitude, but they turn the satellite S in opposite directions.

The satellite, represented by the control system proper 20, has the transfer function $1/S^2 \cdot 1/J$, with S as Laplace operator and J as the moment of inertia. As long as the control moment is effective, the satellite undergoes a constant angular acceleration $$\ddot{\phi}_S = \beta$$

In this equation, $$\ddot{\phi}_S$$

is the angular acceleration produced solely by the control moment, in contrast to the acceleration $$\ddot{\phi}_{int}$$

caused by an interference moment indicated at 19.

The following two control conditions can be indicated for the control circuit of FIG. 1:

$$\text{sign} \cdot \beta = -\text{sign}\ (\phi^* + a\dot{\phi}^*) \qquad (1)$$

for $|\phi_* + a\dot{\phi}^*| > \epsilon$ and $$\ddot{\phi}_S = 0 \qquad (2)$$

for $|\phi^* + a\dot{\phi}^*| \leq \epsilon$

In the above equations, $\epsilon$ is the half-width of the dead zone of the three point regulator 13.

If it is assumed that the sensor has only two steps for each of the positive and negative directions, FIG. 3 is a graphic representation of a regulating process in the phase plane. The term $$-r\dot{\varphi}$$

as well as the sensor characteristic $\varphi^* = f(\varphi)$, is plotted with respect to $\varphi$. The steps of the sensor characteristic lie at the angular deviations $\pm\Phi_1$ and $\pm\Phi_2$. The height of the steps is $\pm H_1$ and $\pm H_2$. The angular range $-\Phi_2 \leq \varphi \leq +\Phi_2$ indicates the admissible tolerance range for the orientation of the satellite axis to be regulated.

The regulating process may start, for example, at point A in the phase plane, as shown in FIG. 3 and point A may have the arbitrary initial conditions $\varphi = \varphi_0$ and $$\dot{\varphi} = \dot{\varphi}_0$$

Due to the control movement, the satellite undergoes the angular acceleration $\beta$ corresponding to a setting phase, until, at the point B in FIG. 3, the term $$a\dot{\varphi} \text{ or } a\dot{\varphi}^*$$

agrees with the sensor reading $\varphi^*$ except for the difference $\epsilon$. The control movement is then stopped. A setting-free phase now commences so that the angular velocity $$\dot{\varphi}$$

and thus $$a\dot{\varphi}$$

likewise remain constant. At the point C of FIG. 3, the first sensor step is reached at $\varphi = \Phi_1$ and, due to the abrupt variation of $\varphi^*$, the oppositely directed control moment becomes effective. The resetting phase begins at point C and continues until the satellite axis 1 (FIG. 7) enters the tolerance range $2\epsilon$ without hunting or overswing.

FIG. 4 illustrates the just described correcting action as a function of time.

If the setting-free phase BC of FIGS. 3 and 4 is eliminated, the regulation has a time-optimum. The setting-free phase is eliminated when the maximum angular deviation $(\Phi)_{max}$ of the regulating process meets the following conditions: $|\Phi|_{max} = 2\Phi_1$ and $$\Phi_2 < |\Phi|_{max} \leq 2\Phi_2$$

For these conditions, the broken line curves of FIG. 3 apply. It has been assumed here that the second characteristic step of the sensor touches the curve portion CO at the point D.

It can also happen that a setting phase is followed by a resetting phase which, in turn, is followed by a setting-free phase. This occurs in the following case:

$$\Phi_1 + \Phi_2 < |\phi|_{max} < 2\Phi_1$$

An example of this case is the curve EFGDO in FIG. 3. The resetting phase is terminated as soon as the second characteristic step of the sensor is reached. When the stepped edge $(\phi = \Phi_2)$ is reached, the setting-free phase terminates and the resetting phase is continued. The regulating process, in this case, is indicated, with respect to time, in FIG. 5. Also, in this case, there is only one reversal of the direction of the setting moment, but the resetting phase is interrupted by the setting-free phase.

As mentioned above, the value of the factor $a$ in Equation 1 is clearly determined by the layout of the sensor characteristic and the angular acceleration of the satellite. According to FIG. 3, the following condition must be present $$-a\dot{\phi}\,(\Phi_1) = H_1 \qquad (3)$$

wherein $H_1$ represents the height of the first step of the sensor characteristic. The known parabolic relation applies to the curve portion CDO in FIG. 3, as follows:

$$-a\dot{\phi} = a\sqrt{2\beta}\,\sqrt{\phi} \qquad (4)$$

By substituting Equation 4 in Equation 3, there is obtained, for the regulator parameter, the following relation $$a = \frac{H_1}{\sqrt{2\beta\Phi_1}} \qquad (5)$$

It will thus be seen that the second characteristics step $H_2$ of the sensor must have a height such that the curve portion CO of FIG. 3 will touch the step edge at the point D. If this step $H_2$ were considerably higher, the regulating process graphically illustrated in FIG. 4 would be interrupted again by a setting free-phase, and the satellite axis 1 would not be aligned with the sighting axis 2 with only one reversal of the control moment. On the other hand, if the step $H_2$ were considerably lower, the axis 1, during its adjustment, would not enter the center of the tolerance range $2\epsilon$, in the case where the regulating operation starts, for example, at the point E of the phase plane. If the second characteristic step does touch the curve portion CO at the point D, the required ratio of the heights of the two steps $H_1$ and $H_2$ is thus clearly determined. According to equation 4, there is obtained:

$$\frac{H_1}{H_2} = \sqrt{\frac{\Phi_1}{\Phi_2}} \qquad (6)$$

The value $\Phi_2$ depends, as mentioned above, on the tolerance range for regulation of the satellite axis 1.

The selection of $\Phi_1$ depends on the quality of the available sensor. That is, it depends on to what extent the sensor is in a position to determine an angular range and to define, in this range, the above steps $\Phi_1$ and $\Phi_2$.

In FIG. 6, the required regulating time T is compared, for an initial deviation $\Phi_0 = 180°$ of the satellite axis, and in accordance with the invention method, for the regulating time T* for an optimum time regulation, which is known per se. In FIG. 6, the ratio T/T* is plotted as a function of the position $\Phi_1$ of the first sensor step. From the curve of FIG. 6, it can be seen that when $\Phi_1 = 25°$, for example, the regulation of the predetermined initial conditions take only about 20% more time than with optimum time regulation wherein $\Phi_1 = 90°$. The curve of FIG. 6 also shows that a sensor with only one step each for positive and negative deviations is not suitable because, if $\Phi_1$ is made equal to $\Phi_2$ and the tolerance range is selected such that $\Phi_2 = 1°$, the regulating process, as graphically illustrated in FIG. 6, would take approximately 4.8 times as long as with optimum time regulation.

Normally, two times two steps, or more, have to be provided for in the characteristic of the sensor. In case an even better approximation to the optimum time regulation is to be achieved in the entire angular range, this is possible by including additional steps in the characteristic of the sensor. The height ratio of these steps is as follows:

$$H_1 : H_2 : H_3 \ldots = \sqrt{\Phi_1} : \sqrt{\Phi_2} : \sqrt{\Phi_3}$$

corresponding to Equation 6. The influence, on regulation by electrical adjustment, of manufacturing tolerances in the sensor can be offset or compensated by assigning definite voltage levels to the individual step heights of the sensor.

In the embodiment of FIG. 1, and effected by switching means not shown in detail, the regulation of $\Phi_1 = 18°$ for the values $\phi_0 = 180°$ and $$\dot{\phi}_0 = 0$$

as shown in FIG. 6, requires about 35% longer than with optimum time regulation. The smaller the maximum angular deviation $(\Phi)_{max}$ is the smaller is the time difference until, at $(\Phi)_{max} = 36°$, the optimum time regulation is attained.

If the tolerance range is fixed with $\Phi_2 = 1°$, there is an interruption of the resetting phase, as indicated in FIG. 6, in the angular range: $19° < |\phi|_{max} < 36°$.

In the range $2° < |\phi|_{max} < 19°$, the regulation occurs in accordance with the curve of FIG. 4.

For the regulating range $1° < |\phi|_{max} < 2°$, the regulation is again effected in an optimum time. The height ratio of the sensor stages is, in accordance with Equation 6, $H_1/H_2 = 4.25$. If $H_1$ is selected to be equal to 1 rad, and the acceleration rate $\beta$ is equal to $10^{-3}$ rad sec.$^{-2}$, there is obtained, according to Equation 5, a value of $a = 40$ sec.

From the foregoing, it will be observed that a single reversal of the direction of rotation of the control movement is sufficient to bring the satellite axis 1 into the tolerance range. If a two-point regulator were used instead of a three-point regulator, the control moment required to correct a deviation would be constantly reversed, as will be apparent from FIG. 4, point B to point C, because there is no stable center position in this type of regulator and the sum $$\phi^* + a\dot{\phi}$$

cannot be exactly equal to zero. The mean control movement would be about zero, and the course of the regulating process would therefore be about the same as with a three-point regulator, but the energy consumption is unnecessarily higher.

Thus, the regulating method and apparatus of the invention is characterized in that, on the one hand, sensors of a relatively simple design can be used while, on the other hand, the energy required to correct a deviation is maintained at as low a value as possible. This is of paramount importance for satellites which must be self-contained, as is well known, with respect to the supporting mass necessary for acceleration.

While a specific embodiment of the invention has been shown and described to illustrate the application of the principles of the invention, it will be understood that the invention may be embodied without departing from such principles.

What is claimed is:

1. In a method for regulating the deviation of acceleration-controlled bodies whose deviation from a predetermined orientation is determined, as to size, direction and acceleration rate, by measuring sensors and converted by a three-point regulator, with linear conversion of the acceleration rate, into a deviation compensating control signal: the improvement comprising the steps of: employing a first measuring sensor to provide a first step signal corresponding to the magnitude and direction of the deviation; employing a second measuring sensor to provide a second linearly variable signal corresponding to the angular velocity of the deviation; comparing said first signal with said second signal in a three-position regulator having a dead zone extending to each side of its null position, to provide a deviation correcting signal for adjusting the orientation of the controlled body through a setting phase to a setting-free phase or to a resetting phase, and vice versa; and switching from one phase to another phase only when the difference between said first signal and said second signal is equal to the half-width of said dead zone.

2. A method, as claimed in claim 1, including the step of multiplying said second signal by a constant factor before comparison with said step signal.

3. A method, as claimed in claim 2, including the step of determining said constant factor by the characteristic of the step signal and the acceleration capacity of the acceleration-controlled body.

4. A method, as claimed in claim 3, including the step of using a step signal characteristic including at least two steps in the positive direction and at least two steps in the negative direction, the heights ($H_1$) and ($H_2$) of these steps being selected as a function of their respective positions ($\Phi_1$) and ($\Phi_2$) according to the relation $$\frac{H_1}{H_2} = \sqrt{\frac{\Phi_1}{\Phi_2}}$$

5. A method, as claimed in claim 4, including the step of determining said constant factor as a function of the height ($H_1$) of the first step in either direction of the characteristic of the step signal, of the maximum angular deviation ($\Phi_1$) within the control range, and of the available angular acceleration ($\beta$) of the acceleration-controlled body.

6. A method, as claimed in claim 5, including the step of determining said constant factor to correspond to the condition $$a = \frac{H_1}{\sqrt{2\beta\Phi_1}}$$

7. Apparatus for regulating the deviation of acceleration-controlled bodies from a predetermined orientation, comprising, in combination, a first sensor determining the magnitude and direction of the deviation and providing a variable output signal; a second sensor determining the rate of the deviation as an angular velocity and converting said angular velocity into a linear output signal; a three-position regulator having a positive correction range, a negative correction range and a null position, and having a dead zone extending to each side of its null position; output combining means connecting the outputs of said first and second sensors directly to the input of said regulator to provide a deviation-correcting signal for adjusting the orientation of the acceleration-controlled body through a setting phase to a setting-free phase or to a resetting phase, and vice-versa; said regulator switching from one phase to another phase only when the difference between said variable signal and said linear signal is equal to the half-width of said dead zone; selectively operable accelerating means on the acceleration-controlled body; and means connected to the output of said regulator and to said accelerating means and effective to activate said accelerating means, responsive to said deviation-correcting signal, in a direction and to an extent to restore said acceleration-controlled body to said predetermined orientation.

8. Apparatus, as claimed in claim 9, in which said regulator includes a comparator circuit having said positive range, said negative range, said null position, and said dead zone said combining stage comprising an addition stage connected to the output of said first sensor and to the input of said comparator circuit; and a multiplication stage connected to the output of said second sensor and to the input of said addition stage.

9. Apparatus, as claimed in claim 8, in which the output of said first sensor is a step signal.

10. Apparatus, as claimed in claim 11, in which said multiplication stage multiplies said linear signal by a constant factor determined by the characteristic of said step signal and the capacity of said accelerating means.

References Cited

UNITED STATES PATENTS

| | | | |
|---|---|---|---|
| 2,116,629 | 5/1938 | Hill | 244—3.15 |
| 3,088,406 | 5/1963 | Horner | 244—3.22 X |
| 3,184,182 | 5/1965 | May et al. | 244—3.22 |
| 3,258,223 | 6/1966 | Skov | 244—3.1 |
| 1,434,158 | 10/1922 | Scott | 318—20.745 |
| 3,030,054 | 4/1962 | Lee et al. | 244—77 |
| 3,176,282 | 3/1965 | Rhoades | 318—20.700 |

OTHER REFERENCES

On-Off Control System for Altitude Stabilization of a Space Vehicle by Josef S. Pistner, pp. 283 to 289 inclusive of April 1959, ARS Journal, ARS Controllable Satellites. Conference April 30–May 1, 1959, Massachusetts Institute of Technology.

FERGUS S. MIDDLETON, *Primary Examiner.*